United States Patent
Habenschaden

(10) Patent No.: US 8,793,056 B2
(45) Date of Patent: Jul. 29, 2014

(54) SENSOR ARRANGEMENT

(75) Inventor: Josef Habenschaden, Kohlberg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 657 days.

(21) Appl. No.: 13/021,009

(22) Filed: Feb. 4, 2011

(65) Prior Publication Data

US 2011/0202242 A1    Aug. 18, 2011

(30) Foreign Application Priority Data

Feb. 18, 2010 (DE) .......................... 10 2010 002 110

(51) Int. Cl.
*G06F 17/00* (2006.01)
*B60K 17/00* (2006.01)

(52) U.S. Cl.
USPC .......................................... 701/51; 180/336

(58) Field of Classification Search
USPC ............ 701/51, 61, 87, 95; 702/127, 150, 85; 180/374, 377, 375, 336
See application file for complete search history.

(56) References Cited

U.S. PATENT DOCUMENTS

| 6,515,228 B2* | 2/2003 | Albert et al. .................. 174/525 |
| 7,543,515 B2* | 6/2009 | Doerr et al. .................. 74/337.5 |
| 7,829,805 B2* | 11/2010 | Ersoy et al. ............... 200/61.88 |
| 2010/0191427 A1* | 7/2010 | Brammer et al. ............... 701/51 |

FOREIGN PATENT DOCUMENTS

| DE | 199 55 603 C1 | 2/2001 |
| DE | 199-55-603 C1 * | 2/2001 |
| DE | 20 2005 016 333 U1 | 1/2006 |
| DE | 202005-016333 * | 1/2006 |
| DE | 10 2004 056 800 A1 | 6/2006 |
| DE | 10 2005 034 864 A1 | 2/2007 |
| DE | 10 2006 050 429 A1 | 4/2008 |

* cited by examiner

*Primary Examiner* — Muhammad Shafi
(74) *Attorney, Agent, or Firm* — Davis & Bujold, PLLC; Michael J. Bujold

(57) ABSTRACT

A sensor arrangement for an electronic transmission control unit of an automatic transmission accommodated in a transmission housing. The sensor arrangement comprises first and second pick-up arrangements for detecting various positions of an actuator system of the automatic transmission. The first pick-up arrangement is provided for monitoring a first position range of the actuator system remote while the second pick-up arrangement is provided for monitoring a second position range of the actuator system different from the first position range. The first and the second pick-up arrangements are connected to a common evaluation unit which, via a single common interface, connects with the electronic transmission control unit for transmitting the position signals of the first and second position range.

19 Claims, 4 Drawing Sheets

(PRIOR ART) Fig. 1

SENSOR ARRANGEMENT

This application claims priority from German patent application serial no. 10 2010 002 110.5 filed Feb. 18, 2010.

FIELD OF THE INVENTION

The present invention concerns a sensor arrangement.

BACKGROUND OF THE INVENTION

In the prior art numerous sensor arrangements are known; in the present case the sensor arrangement is one with two pick-up arrangements. The pick-up arrangements each comprise at least one pick-up, and for example the pick-ups of both pick-up arrangements work according to the same measurement principle, in particular each being inductive measurement pick-ups. The sensor arrangement is provided for detection within two spatially separated position zones.

The sensor arrangement according to the invention is designed in particular for arrangement on an electronic transmission control unit of an automatic transmission, for example a dual-clutch transmission. In such an arrangement, the sensor arrangement detects, for example, the gear setting in the automatic transmission in various position ranges. Such a control unit for connection to a sensor arrangement is described for example in the document DE 199 55 603 C1.

A sensor arrangement with a pick-up arrangement that uses inductive measurement pick-ups is described for example in the document DE 20 2005 016 333 U1, where in a known manner the pick-up arrangement is arranged on an associated evaluation unit for monitoring a position range. Considerable structural space is taken up when monitoring a number of position ranges spatially remote from one another by means of such sensor arrangements.

SUMMARY OF THE INVENTION

Starting from there, the purpose of the present invention is to propose a sensor arrangement for monitoring the settings of an actuator system in a number of position ranges, which overcomes the disadvantages of the prior art and is characterized by small structural size along with minimal use of material and low costs.

According to the invention a sensor arrangement is proposed for an electronic transmission control unit of an automatic transmission, in particular to be accommodated in a transmission housing, the sensor arrangement comprises first and second pick-up arrangements for detecting various positions of an actuator system of an automatic transmission, in which the first pick-up arrangement is provided for monitoring a first position range of the actuator system that is remote from the second pick-up arrangement and is connected to a first evaluation unit; the second pick-up arrangement is provided for connection to a second evaluation unit, and the second pick-up arrangement is provided for monitoring a second position range of the actuator system different from the first position range; characterized in that the first and second pick-up arrangements for position monitoring are connected to a common evaluation unit, and the common evaluation unit has a single, common interface that connects to an electronic transmission control unit for the output of a position signal of the first and the second position range.

In an embodiment of the sensor arrangement according to the invention, the common evaluation unit is formed exclusively by the first evaluation unit in such a manner that the first and second pick-up arrangements make use of its functionality in common.

According to another feature of the sensor arrangement according to the invention, the first and second sensor arrangements are arranged at an angle relative to one another, such that the common evaluation unit is arranged in an apex area or the arms of the angle.

In still another embodiment of the sensor arrangement according to the invention, the first and second sensor arrangements each comprise at least one inductive pick-up, in particular an inductive travel-path or angle pick-up.

Furthermore, according to the invention a sensor is proposed in which the first and second pick-up arrangements and the common evaluation unit are arranged in a common housing and/or on a common circuit support and are constructed integrally.

According to one aspect of the sensor arrangement according to the invention, the first and second pick-up arrangements are arranged on an actuator system for monitoring the shift steps of a transmission, particularly located close to a selector lever.

In an embodiment of the sensor arrangement according to the invention, the sensor arrangement can be supplied with electrical energy via the common interface.

According to the invention an electronic transmission control unit is also proposed, in which the transmission control unit comprises a sensor arrangement according to the invention.

In an embodiment of the electronic transmission control unit according to the invention, the electronic transmission control unit is connected to the sensor arrangement exclusively by means of the common interface.

BRIEF DESCRIPTION OF THE DRAWINGS

Other features and advantages of the invention emerge from the description given below, of example embodiments of the invention, with reference to the figures in the drawings, which illustrate details that are essential to the invention, and from the claims. The individual features can each be implemented in variants of the invention either alone as such or together in any desired combination.

Below, preferred embodiments of the invention are explained in more detail with reference to the attached drawings, which show.

DETAILED DESCRIPTION OF THE PREFERRED EMBODIMENTS

In the description below and the drawings, the same indexes are used for elements with the same or comparable functions.

Figure 1:
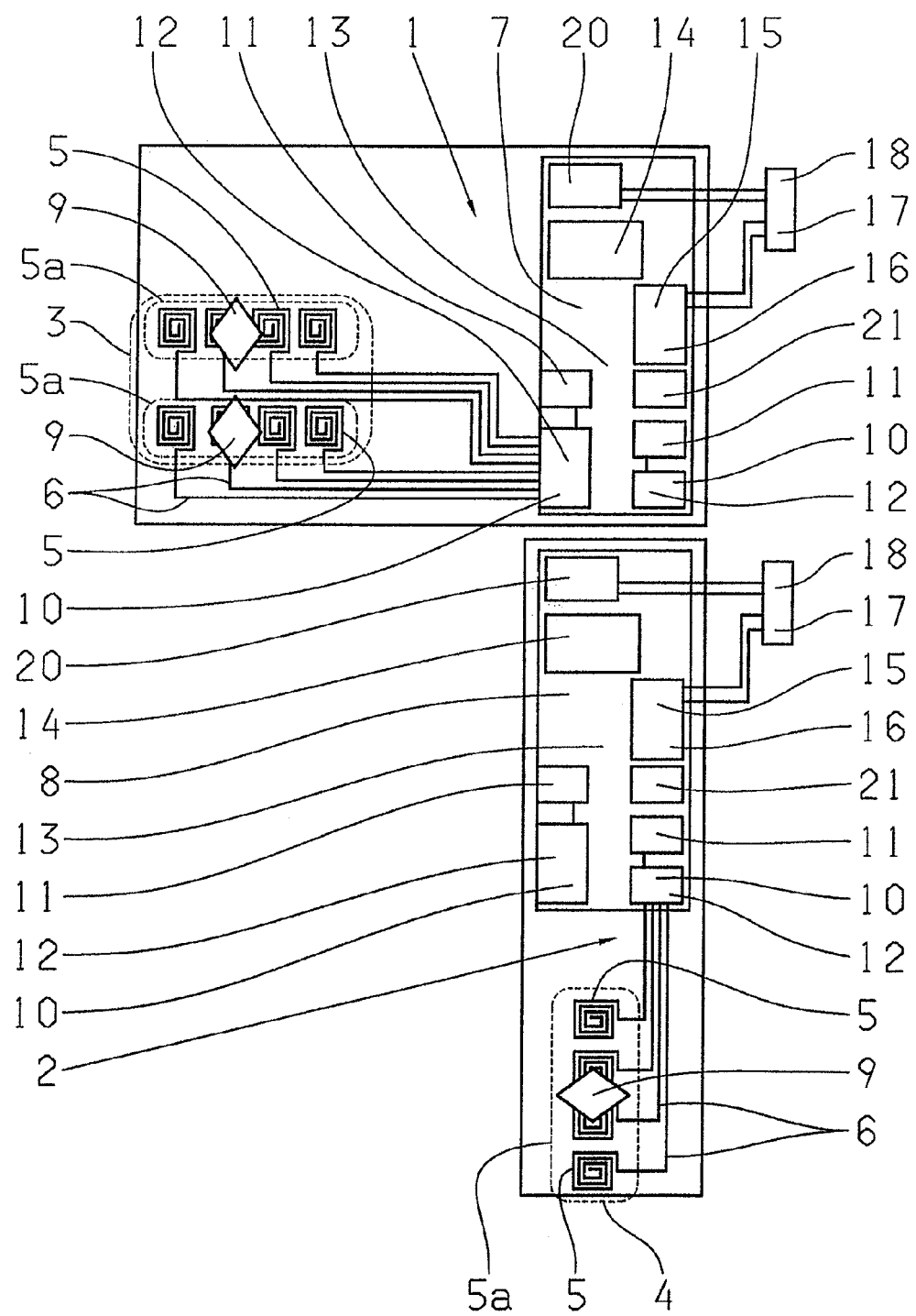
FIG. 1: As an example, first and second sensor arrangements according to the prior art, in one embodiment of the invention.

FIG. 1 shows as an example a first 1 and a second 2 sensor arrangement of the prior art which, to monitor various position ranges of an actuator system, are arranged close to one another and in particular enclosing an angle relative to one another, such that each of the sensor arrangements 1 and 2 is provided for detecting within just one position range. Such an arrangement can be used for example to monitor the drive settings N (neutral), P (parking), D (drive), B (brake, engine brake) and R (reversing), and if necessary other ones in an automatic transmission by detecting, for example, the selector lever position. Here, a first position range to be monitored by the first sensor arrangement 1 includes for example the safety-relevant drive settings N and P, which are usually monitored redundantly. A second position range, monitored by the second sensor arrangement 2, includes for example the drive settings P, D, B and sometimes others as well.

To monitor their respective position range the first and second sensor arrangements 1 and 2 each comprise as a first link of the measurement chain a pick-up arrangement 3 or 4 respectively, with each pick-up arrangement 3 or 4 comprising one or more measurement pick-ups or pick-ups 5. A pick-up arrangement 3 or 4 comprises at least one pick-up 5 for example arranged in a strand formation, i.e. a pick-up strand 5*a*, such that each pick-up 5 can deliver measurement signals via a connection line 6, in the form of a conducting track, to an evaluation unit 7 or 8 that is respectively connected to the pick-up arrangement 3 or 4 concerned. For example, the evaluation unit 7 or 8 is formed integrally with its respective pick-up arrangement 3 or 4, i.e. integrated for example as a sensor module. The first evaluation unit 7 is connected to the first pick-up arrangement 3 and the second evaluation unit 8, which is configured identically to the first evaluation unit 7, is connected to the second pick-up arrangement 4.

In the present example, the known pick-up arrangements 3, 4, which are configured like the examples described in the document DE 20 2005 016 333 U1, each comprise inductive pick-ups 5 in a form such as sensor coils. A sensor coil is a coil which consists of a winding, in particular spiral-wound conducting track and is for example arranged planar on a circuit support such as a printed circuit board, a flexible printed circuit, etc., which is formed integrally with the evaluation unit 7 or 8. The pick-ups 5, each in the form of a sensor coil, are acted upon with a high-frequency alternating current from the evaluation unit 7 or 8 respectively connected to the pick-up arrangement 3 or 4 concerned for position-determination.

In this example the first pick-up arrangement 3 is designed with redundancy, i.e. it comprises redundant measurement means or pick-ups 5, for example in order to be able to detect safety-relevant positions in a position range of an actuator system to be monitored even if one or more pick-ups 5 of a pick-up strand 5*a* has/have failed. For this purpose the first pick-up arrangement 3 comprises first and second pick-up strands 5*a* which, with regard to the number and arrangement of the pick-ups 5 arranged therein, can be configured similarly or identically.

Close to the sensor coils and on the actuator system, arranged to move together with it, for each pick-up strand 5*a* there is a damping element 9 which co-operates with the respective pick-up arrangement 3 or 4. If the damping element 9, for example a diamond-shaped damping element 9 moves as a result of a change in position of the actuator system relative to the sensor coil(s), in particular in the specified movement direction or along a specific path or measurement path and close to a sensor coil, the damping value changes as a function of the position of the damping element 9, i.e. the inductance L of the sensor coil concerned through which high-frequency current is flowing, changes.

The evaluation unit 7 or 8 respectively connected to the pick-up arrangement 3 or 4 of the sensor arrangement 1 or 2 respectively can on this basis determine a position of the actuator system in the position range to be monitored, for example as a result of the voltage drop resulting from the changed inductive resistance of the pick-up 5 concerned. To achieve a desired position resolution or monitoring of the target position range, the number of pick-ups 5 in the form of sensor coils, can be chosen appropriately for each pick-up arrangement 3 or 4.

For its connection to or with a respective pick-up arrangement 3 or 4, the first and the second evaluation unit 7, 8 comprise in each case a first and second connection terminal 10, each of which can be formed by a multiplexer 12 or a multiplexer connected to an amplifier 11. By virtue of such a terminal 10, a pick-up arrangement 3 or 4 connected for example by conducting tracks 6 can be acted upon with high-frequency amplified alternating current, particularly of the same amplitude and a constant frequency, such that the pick-ups 5 of each pick-up arrangement 3, 4 are acted upon one after another. The voltage value that can be detected by each pick-up 5 at the terminal 10, corresponding to a relative position of the damping element 9 and sensor coil or pick-up 5, can then be sent to a micro-controller 13 of the evaluation unit 7 or 8 for position determination, for example by means of an A/D converter. Instead of a micro-controller 13, an ASIC (Application Specific Integrated Circuit) can be provided.

The respective first or second evaluation unit 7, 8, which is designed in particular as an electronic evaluator or electronic module, can have two connection terminals 10 to provide a user with the option of forming the first or the second sensor arrangement 1, 2 by means of the same electronic module. Furthermore, on the evaluation unit 7 or 8 which, is made on a circuit support in the form of a printed circuit board, there is for example in each case provided a condition-monitoring device 14 in the form of a monitoring module or 'watchdog' which monitors the micro controller 13 and is designed to recognize defects.

In addition an evaluation unit 7 or 8 comprises in each case a signaling device 15 designed to produce a suitable position or output signal that corresponds with the position of the actuator system within the position range concerned. The signaling device 15 comprises a signal generator module 16, such as a PWM module, which produces an output signal based on the position determined by the micro controller. The signal so generated, for example a PWM signal, can be picked up at an output of the evaluation unit 7 or 8 concerned for the output of the position signal determined, for example via a plug-in connection that can be formed by a plug 17 or some signal-transmitting coupling device different there from, which to that extent provides or forms an interface 18 for connection to an electronic transmission control unit 19. To supply its components with an appropriate voltage, the evaluation unit 7 or 8 has in each case a voltage regulator 20 which can be supplied with electrical energy by means of the interface 18 or plug 17.

Figure 2:
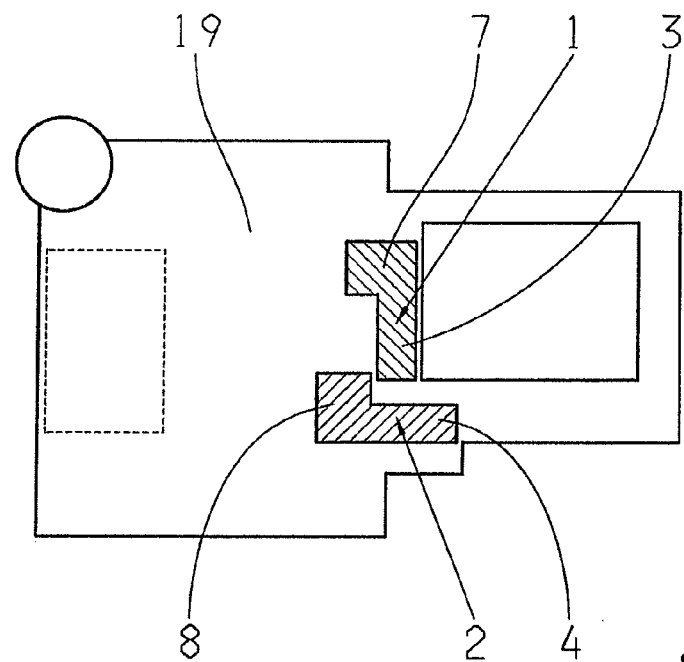
FIG. 2: As an example, the location of the first and second sensor arrangements of the prior art on an electronic transmission control unit.

FIG. 2 shows as an example the known configuration of the first and the second sensor arrangements 1, 2 on an electronic transmission control unit 19. For position determination the first and second sensor arrangements 1, 2 are located in different position ranges spatially separate from one another and at a distance apart, and take up considerable fitting space. In this case it is provided that the two pick-up arrangements 3, 4 extend in different directions, for example with their respective pick-up strands 5*a* making an angle with one another. For example, in the arrangement illustrated the pick-up strands 5*a* of the first pick-up arrangement 3 and the second pick-up arrangement 4 are arranged perpendicularly to one another at an angle of 90°.

Figure 3:
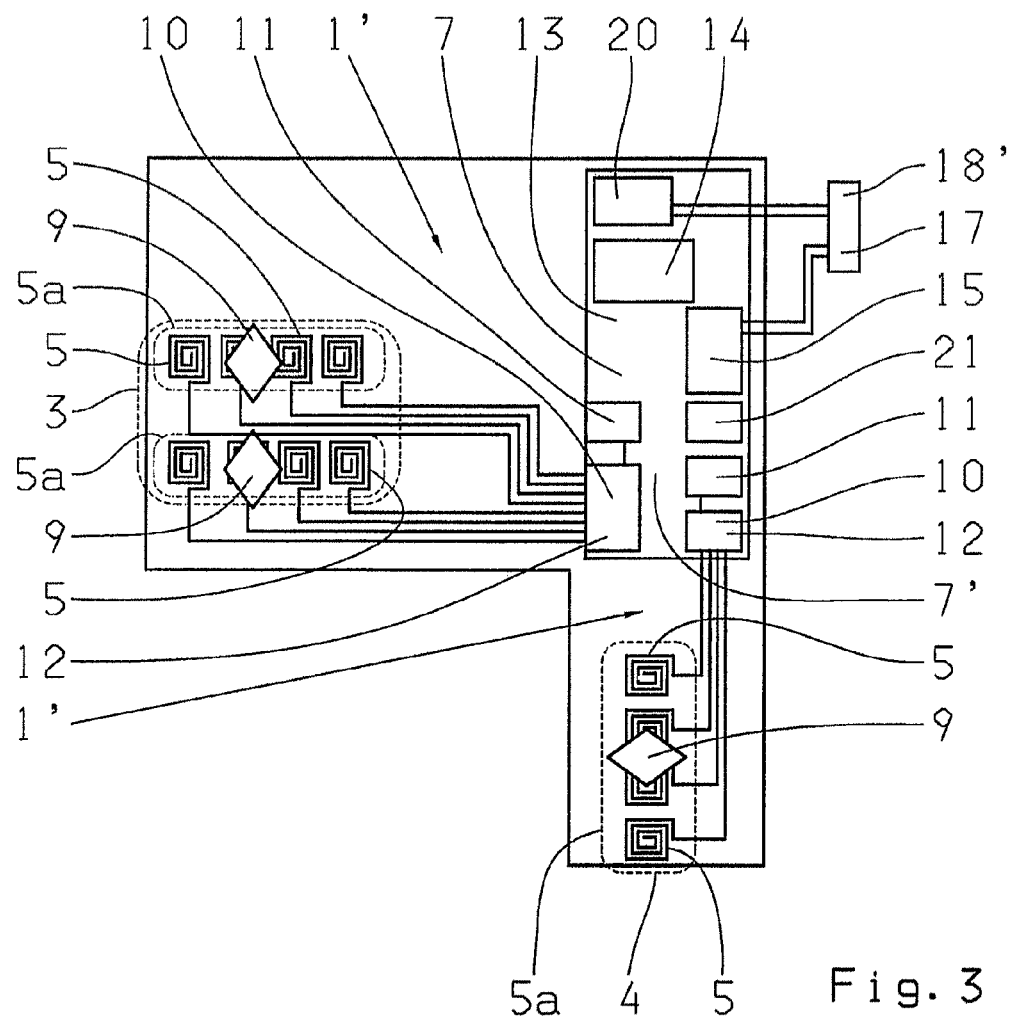
FIG. 3: As an example, a sensor arrangement according to an embodiment of the invention.

FIG. 3 shows a sensor arrangement 1' according to the present invention. The sensor arrangement 1' according to the invention is provided in particular for an electronic transmission control unit 19 to be accommodated in a transmission housing. The sensor arrangement 1' according to the invention comprises a first pick-up arrangement 3 which is designed as described above and is coupled or connected to an evaluation unit 7 as described above. The first pick-up arrangement 3 is provided for monitoring a first position range of an actuator system, such as the above-described setting range of a selector lever, i.e. the settings D and P.

In addition the sensor arrangement 1' according to the invention comprises a second pick-up arrangement 4 of the type described above, provided for monitoring a second position range of the actuator system different from the first position range and for connection to a second evaluation unit 8. In this case the second pick-up arrangement 4 comprises pick-ups 5 which work according to the same measurement principle as the pick-ups 5 of the first pick-up arrangement 3. In particular, the first 3 and second 4 pick-up arrangements comprise exclusively pick-ups 5 in the form of sensor coils which work according to the same measurement principle and are identically designed.

The pick-ups 5 of the pick-up arrangements 3, 4 of the sensor arrangement 1' according to the invention can for example be Hall elements such as inductive pick-ups, which work according to the principle described in DE 20 2005 016 333 U1, or some other type of pick-up such as angle pick-ups, and the pick-up strands 5a can each be curved in a circular arc. The pick-ups 5 are arranged on an actuator system to be monitored in such a manner that they extend close to the respective position range to be monitored by each.

According to the invention the second pick-up arrangement 4 and the first pick-up arrangement 3 are connected to a common evaluation unit 7', this common evaluation unit 7' has a single common interface 18' for connection to an electronic transmission control unit 19 for the output of a position signal for the first and second position range.

In the embodiment shown in FIG. 3, both the second pick-up arrangement 4 and the first pick-up arrangement 3 are connected to the evaluation unit 7 of the first pick-up arrangement 3, in such a manner that the evaluation unit 7 of the first pick-up arrangement 3 forms the common evaluation unit 7'. Thus, to form a sensor arrangement 1' according to the invention the second pick-up arrangement 4 is connected to the first evaluation unit 7, in particular exclusively thereto, in such a manner that the first 3 and second 4 pick-up arrangements co-operate solely or exclusively with the evaluation unit 7 of the first pick-up arrangement 3 to monitor the first and the second position ranges.

In such an arrangement according to the invention the first 3 and the second 4 pick-up arrangements co-operate by means of electronic components of the first evaluation unit 7 or common evaluation unit 7' used in common, to monitor the first and second position range. Both for evaluating the measurement signals of the first and second pick-up arrangements 3, 4 and for emitting position signals based on these, to an electronic transmission control unit 19, the first and second pick-up arrangements 3, 4 share the functionality of the common evaluation unit 7'.

In such an arrangement the first pick-up arrangement 3 can be connected to the first evaluation unit 7 via a first terminal 10 or its multiplexer 12 and the second pick-up arrangement 4 via the second terminal 10 or its multiplexer, i.e. exclusively to the first evaluation unit 7 or 7'. Consequently the two pick-up arrangements 3, 4 are each operated or controlled by a respective multiplexer 12, which in each case can have an amplifier 11, connected upstream from it for signal amplification.

The voltages at the pick-ups 5 of the first and second pick-up arrangements 3, 4 are measured, for example by the micro controller 13 of the first evaluation unit 7 or common evaluation unit 7', in a fixed cycle, such that to take both pick-up arrangements 3, 4 into account when generating signals, the micro controller 13 can contain or store appropriate commands by means of a programmable block 12 in the form of an EPROM, a flash-EPROM, an EEPROM or in the ROM. Corresponding commands for signal processing can also be implemented by means of an ASIC which can be appropriately programmed in accordance with the type of pick-up arrangement 3, 4 connected and can be provided in place of the micro controller 13. On the basis of the voltages determined at the pick-ups 5, the micro controller 13 can now emit position signals for both position ranges.

In this case it is envisaged that the signaling device 15 generates position signals for both position ranges, which are sent to an output in particular by means of a single signal-transmitting coupling device or a plug 17 that forms a single common interface 18'. For this purpose the interface 18' is preferably also designed to supply the common evaluation unit 7' with electrical energy.

To be able to carry out the functions of the first and the second evaluation units 7, 8 by means of a common evaluation unit 7' in a first scan cycle, a position signal for the first pick-up arrangement 3 can be determined and emitted, and in the next scan cycle a position signal for the second pick-up arrangement 4. For this, the scan rate envisaged for one pick-up arrangement 3, 4 can be halved or, in order to obtain the same number of position signals as when only one pick-up arrangement is connected, the scan frequency is increased correspondingly, for example by suitable programming.

Figure 4:
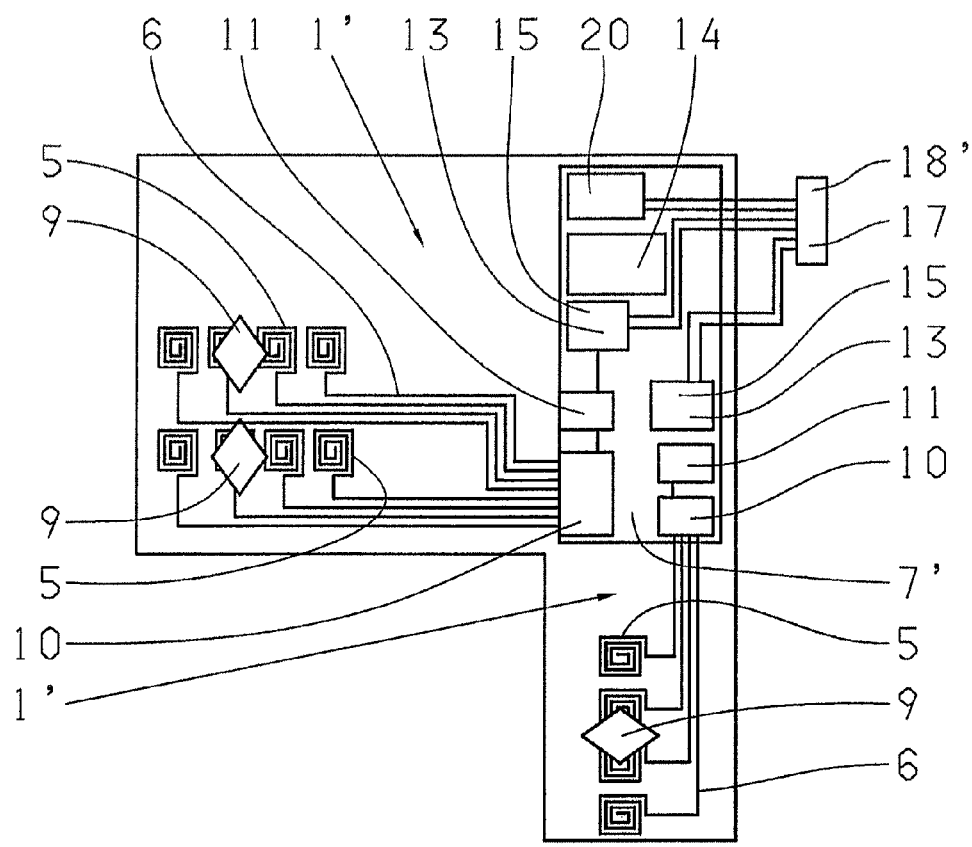
FIG. 4: As an example, a sensor arrangement according to another embodiment of the invention.

In a further sensor arrangement 1' according to the invention illustrated in FIG. 4, it is envisaged to make the common evaluation unit 7' in some areas and in relation to its components partially redundant, for example to duplicate components for signal processing such as the micro controller 13 or an ASIC that can be used in place of it, in order to achieve increased processing speed and enable parallel processing of the measurement signals.

In the sensor arrangement 1' shown in FIG. 4 a micro controller 13 is associated with each connection terminal 10 of each pick-up arrangement 3, 4, while signal output can again take place via a common signaling device 15. For this, a PWM module 16 can for example be used in common or controlled by each of the two micro controllers 13 or ASICs. Alternatively, as shown, signal production can be carried out by the respective micro controller 13 associated with each pick-up arrangement 3 or 4, and the micro controller 13 or ASIC is then designed appropriately for signaling. The position signals produced are sent for example serially or in parallel for emission to the output, which is again formed in particular as a common interface 18' for example by means of a plug connection element 17. To form a common interface 18', the suitably timed position signals are emitted, for example serially or in parallel, by the signaling device 15 or a micro controller 13 or ASIC.

Figure 5:
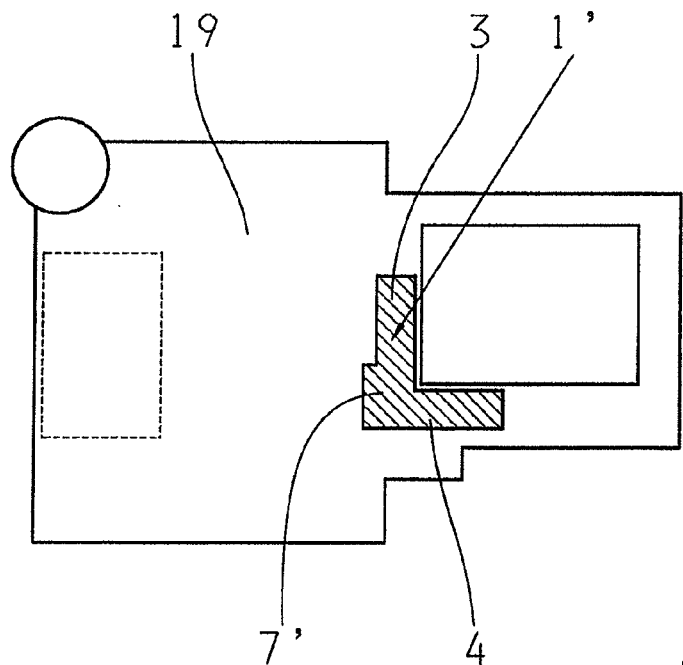
FIG. 5: As an example, a sensor arrangement according to the invention on an electronic transmission control unit.

FIG. 5 shows an example of a possible arrangement of the pick-up arrangements 3, 4 made possible by the sensor arrangement 1' according to the invention on a common evaluation unit 7'. As shown, the structural fitting space required can be reduced.

In the sensor arrangement 1' according to the invention, with regard to their respective pick-up strands 5a, the pick-up arrangements 3, 4 can be positioned at an angle to one another, such that the common evaluation unit 7' is arranged in an apex area, i.e. in an apex area formed by the angle arms of the pick-up strands 5a, so that for both pick-up arrangements there are short feed- or measurement-lines. In particular an integral configuration of the pick-up arrangements 3, 4 with a common evaluation unit 7' in an angular arrangement is possible, for example an angle arrangement in which the pick-up strands 5a of the first and second pick-up arrangements 3, 4 form a right-angle, i.e. 90 degrees.

The sensor arrangement according to the invention comprising two pick-up arrangements 3, 4 can be of modular form and/or accommodated in a single housing, for example with the first and the second pick-up arrangements 3, 4 arranged on a common circuit support. In this way a combination of two sensor modules 1, 2 in a single mechanical-electronic assembly can be produced. In such a case the distance between the evaluation unit 7' and in particular the micro controller 13 or the ASIC should not exceed for example 3 cm, since otherwise the very weak HF signals would not be transmitted without interference or with too low a voltage level.

By virtue of the sensor arrangement 1' according to the invention, the structural and connection technology (SCT) in an electronic transmission control unit 19, required for its connection to a first and a second sensor arrangement 1, 2, can be reduced considerably since instead of a plurality of interfaces 18 only one interface 18' has to be connected to the electronic control unit 19. In this way a voltage supply needs to be provided only for one evaluation unit 7'. Even with complete redundancy of the components of the evaluation unit 7' (duplicate evaluation, signaling device, voltage regulation, etc.) the SCT is much simpler and leads to cost savings.

INDEXES

1 First sensor arrangement
1' Sensor arrangement
2 Second sensor arrangement
3 First pick-up arrangement
4 Second pick-up arrangement
5 Pick-up
5a Pick-up strand
6 Connection line
7 First evaluation unit
7' Common evaluation unit
8 Second evaluation unit
9 Damping element
10 Connection terminal
11 Amplifier wonderful
12 Multiplexer
13 Micro controller
14 Monitoring device
15 Signaling device
16 Signal generator module
17 Plug connector element
18, 18' Interface
19 Electronic transmission control unit
20 Voltage regulator
21 Programmable unit

The invention claimed is:

1. A sensor arrangement (1') for an electronic transmission control unit (19) of an automatic transmission, accommodated in a transmission housing, the sensor arrangement (1') comprising:

a first pick-up arrangement (3) and a second pick-up arrangement (4) for each detecting various positions of an actuator system of the automatic transmission, the first pick-up arrangement (3) monitoring a first position range of the actuator system remote from the second pick-up arrangement (4);

the second pick-up arrangement (4) monitoring a second position range of the actuator system different from the first position range;

the first and the second pick-up arrangements (3, 4) being connected to a common evaluation unit (7'), via a respective connection terminal (10), for position monitoring, the common evaluation unit (7'), comprising a single, common interface (18') for connection to the electronic transmission control unit (19) for outputting of a position signal for the first and the second position ranges; and one of a separate micro controller (13) or a separate Application Specific Integrated Circuit being connected to both the respective connection terminal (10) of the first pick-up arrangement (3) and the respective connection terminal (10) of the second pick-up arrangement (4).

2. The sensor arrangement (1') according to claim 1, wherein the common evaluation unit (7') is formed exclusively by a first evaluation unit (7), in such a manner that the first and the second pick-up arrangements (3, 4) make conjoint use of a functionality of the common evaluation unit (7').

3. The sensor arrangement (1') according to claim 1, wherein the first and the second pick-up arrangements (3, 4) are positioned at an angle relative to one another, and the common evaluation unit (7') is positioned adjacent an apex area of the angle.

4. The sensor arrangement (1') according to claim 1, wherein the first and the second pick-up arrangements (3, 4) each comprise at least one inductive pick-up (5).

5. The sensor arrangement (1') according to claim 1, wherein the first and the second pick-up arrangements (3, 4) and the common evaluation unit (7') are at least one of arranged in a common housing and on a common circuit support.

6. The sensor arrangement (1') according to claim 1, wherein the first and the second pick-up arrangements (3, 4) are arranged on an actuator system for monitoring shift steps of the transmission.

7. The sensor arrangement (1') according to claim 1, wherein the sensor arrangement (1') is supplied with electrical energy via the common interface (18').

8. The sensor arrangement (1') according to claim 1, wherein the one of the separate micro controller (13) or the separate Application Specific Integrated Circuit is directly connected to each respective connection terminal (10) of each of the first and the second pick-up arrangement (3, 4).

9. The sensor arrangement (1') according to claim 1, wherein the one of the separate micro controller (13) or the separate Application Specific Integrated Circuit is directly connected to a respective amplifier (11) of each respective connection terminal (10) of each of the first and the second pick-up arrangement (3, 4).

10. An electronic transmission control unit (19) in combination with a sensor arrangement (1') for an automatic transmission, accommodated in a transmission housing, the sensor arrangement (1') comprising:

a first pick-up arrangement (3) and a second pick-up arrangement (4) each for detecting various positions of an actuator system of the automatic transmission, the first pick-up arrangement (3) monitoring a first position range of the actuator system, and the first pick-up arrangement (3) being spaced and remote from the second pick-up arrangement (4);

the second pick-up arrangement (4) monitoring a second position range of the actuator system which is different from the first position range;

the first and the second pick-up arrangements (3, 4) are connected, via a respective multiplexer (12), to a common evaluation unit (7') for position monitoring, the common evaluation unit (7') comprising the respective multiplexers (12) and a single, common interface (18') for connection to the electronic transmission control unit (19) for outputting a position signal for the first and the second position ranges; and one of a separate micro controller (13) or separate Application Specific, Integrated Circuit is associated with the respective multiplexer (12) of the first pick-up arrangement (4) and the respective multiplexer (12) of the first pick-up arrangement (4).

11. The electronic transmission control unit (19) in combination with the sensor arrangement (1') according to claim 10, wherein the electronic transmission control unit (19) is connected to the sensor arrangement (1') exclusively by the common interface (18').

12. A sensor arrangement (1') for an electronic transmission control unit (19) of an automatic transmission which is accommodated in a transmission housing, the sensor arrangement (1') comprising:

a first pick-up arrangement (3) for monitoring a first position range of an actuator system of the automatic transmission;

a second pick-up arrangement (4) for monitoring a second position range of the actuator system of the automatic transmission, and the second pick-up arrangement (4) being spaced and remote from the first pick-up arrangement (3);

the first and the second pick-up arrangements (3, 4) are connected to a common evaluation unit (7') comprising a single, common interface (18') which is connected to the electronic transmission control unit (19) for output of a position signal of each of the first and the second position ranges; and the common interface (18') comprising first and second multiplexers (12) with the first pick-up arrangement (3) exclusively communicating with the first multiplexer (12) and the second pick-up arrangement (4) exclusively communicating with the second multiplexer (12) and both of the first and second multiplexers (12) communicating with the common interface (18') via a respective first and second micro controllers (13) or respective first and second Application Specific Integrated Circuits.

13. The sensor arrangement (1') according to claim 12, wherein the first and the second pick-up arrangements (3, 4) are positioned at an angle relative to one another, and the common evaluation unit (7') is positioned adjacent an apex area of the angle.

14. The sensor arrangement (1') according to claim 12, wherein the first and the second pick-up arrangements (3, 4) each comprise at least one inductive pick-up (5).

15. The sensor arrangement (1') according to claim 12, wherein the first and the second pick-up arrangements (3, 4) and the common evaluation unit (7') are at least one of arranged in a common housing and on a common circuit support.

16. The sensor arrangement (1') according to claim 12, wherein the actuator system is a selector lever of the automatic transmission and the first and the second pick-up arrangements (3, 4) monitor shifting of transmission steps.

17. The sensor arrangement (1') according to claim 12, wherein the sensor arrangement (1') is supplied with electrical energy via the common interface (18').

18. The sensor arrangement (1') according to claim 12, wherein the first and the second pick-up arrangements (3, 4) and the common evaluation unit (7') are all formed integrally with one another and incorporated in the sensor arrangement.

19. The sensor arrangement (1') according to claim 12, wherein a distance between the first pick-up arrangement (3) and the common evaluation unit does not exceed 3 cm and a distance between the second pick-up arrangement (4) and the common evaluation unit does not exceed 3 cm.

* * * * *